(12) United States Patent
Düring et al.

(10) Patent No.: US 10,383,345 B2
(45) Date of Patent: Aug. 20, 2019

(54) METHOD FOR OBTAINING NAPIN AND CRUCIFERIN OR A MIXTURE THEREOF FROM RAPESEED

(71) Applicants: Pilot Pflanzenöltechnologie Magdeburg e.V., Magdeburg (DE); Klaus Düring, Frechen (DE)

(72) Inventors: Klaus Düring, Frechen (DE); Ralf-Peter Tressel, Herzberg (DE); Barbara Schulze, Magdeburg (DE); Frank Pudel, Magdeburg (DE)

(73) Assignees: Pilot Pflanzenöltechnologie Magdeburg e.V., Magdeburg (DE); Klaus Düring, Frechen (DE)

( * ) Notice: Subject to any disclaimer, the term of this patent is extended or adjusted under 35 U.S.C. 154(b) by 68 days.

(21) Appl. No.: 15/290,477

(22) Filed: Oct. 11, 2016

(65) Prior Publication Data
US 2017/0027190 A1 Feb. 2, 2017

Related U.S. Application Data

(63) Continuation of application No. PCT/EP2015/000759, filed on Apr. 10, 2015.

(30) Foreign Application Priority Data

Apr. 12, 2014 (DE) .................. 10 2014 005 466

(51) Int. Cl.
*B01D 11/02* (2006.01)
*B01D 15/08* (2006.01)
(Continued)

(52) U.S. Cl.
CPC . *A23J 1/14* (2013.01); *A23J 3/14* (2013.01); *B01D 11/02* (2013.01);
(Continued)

(58) Field of Classification Search
CPC ... B01D 11/02; B01D 11/0288; B01D 11/028; B01D 15/08; B01D 15/36; B01D 15/361; B01D 15/362; A23J 1/14; A23J 3/14
See application file for complete search history.

(56) References Cited

U.S. PATENT DOCUMENTS

| 4,368,151 A | 1/1983 | Howard et al. |
| 4,370,267 A | 1/1983 | Lehnhardt et al. |

(Continued)

FOREIGN PATENT DOCUMENTS

| WO | 02/005922 A1 | 1/2002 |
| WO | 02/089597 A1 | 11/2002 |

(Continued)

OTHER PUBLICATIONS

Machine translation of WO 02/052922, originally published Jan. 24, 2002. (Year: 2002).*

(Continued)

*Primary Examiner* — Katherine Zalasky
(74) *Attorney, Agent, or Firm* — Perkins Coie LLP; Viola T. Kung

(57) ABSTRACT

Described is a method for obtaining a mixture of the rapeseed proteins napin and cruciferin, or the individual proteins, in pure form from rapeseed meal, wherein once a raw extract has been obtained using a suitable extraction medium the desired proteins are purified from the raw extract by several purification steps at defined pH levels.

12 Claims, 10 Drawing Sheets

(51) Int. Cl.
*B01D 15/36* (2006.01)
*A23J 1/14* (2006.01)
*A23J 3/14* (2006.01)

(52) U.S. Cl.
CPC .......... *B01D 11/0288* (2013.01); *B01D 15/08* (2013.01); *B01D 15/362* (2013.01)

(56) References Cited

U.S. PATENT DOCUMENTS

| | | | |
|---|---|---|---|
| 7,750,119 B2* | 7/2010 | Segall | A23J 1/14 530/370 |
| 8,580,330 B2* | 11/2013 | Schweizer | A23J 1/14 426/656 |
| 2004/0034200 A1* | 2/2004 | Logie | A23J 1/14 530/377 |
| 2005/0181112 A1* | 8/2005 | Schweizer | A23J 1/14 426/656 |
| 2005/0249828 A1* | 11/2005 | Logie | A23J 1/14 424/755 |
| 2009/0036655 A1 | 2/2009 | Segall et al. | |
| 2010/0136173 A1 | 6/2010 | Tang et al. | |
| 2010/0249378 A1 | 9/2010 | Wanasundara et al. | |
| 2012/0252065 A1 | 10/2012 | Rozenszain et al. | |

FOREIGN PATENT DOCUMENTS

| | | |
|---|---|---|
| WO | 03/043438 A1 | 5/2003 |
| WO | 2008/144939 A1 | 12/2008 |
| WO | 2009/018660 A1 | 2/2009 |
| WO | 2010/020039 A1 | 2/2010 |
| WO | 2011/032266 A1 | 3/2011 |
| WO | 2011/057407 A1 | 5/2011 |
| WO | 2013/000066 A1 | 1/2013 |

OTHER PUBLICATIONS

Bérot, S. et al., "Large scale purification of rapeseed proteins (*Brassica napus* L.)", Journal of Chromatography B, vol. 818, Issue 1, Apr. 15, 2005, pp. 35-42.

* cited by examiner

Emulsifying properties after Muschiolik (2013)

|  | phase stability emulsion 14 days, 16°C | | | heat stability 90°C, 60 min, stable phase[1) |
| --- | --- | --- | --- | --- |
|  | non-diluted | 1:1 diluted | 1:20 diluted |  |
| rapeseed protein mixture | -- | -- | ------ | - |
| cruciferin | -- | ---- | ------ | ++ |
| napin | ++ | ++ |  | +++ |

Figure 10

METHOD FOR OBTAINING NAPIN AND CRUCIFERIN OR A MIXTURE THEREOF FROM RAPESEED

This application is a Continuation of PCT/EP2015/000759, filed Apr. 10, 2015, which claims priority of DE102014005466.7, filed Apr. 12, 2014. The contents of the above-identified applications are incorporated herein by reference in their entirety.

The present invention relates to a method for obtaining a defined mixture of the rapeseed proteins napin and cruciferin, or the individual proteins, resp., from rapeseed meal in pure form, wherein once a raw extract has been obtained using a suitable extraction medium the desired proteins are purified from the raw extract by several purification steps at defined pH levels.

Plant storage proteins mainly are globulins, rarely albumins. Rapeseed is the most important plant in whose sees larger amounts of albumin occur. The rapeseed albumin is called napin. The rapesee globulin is called cruciferin. Naturally ca. 60% cruciferin and ca. 20% napin are present in rape seeds.

Albumins are commercially required in many fields of application. Due to the low abundance of albumins in plants and due to the absence of industrial purification methods for napin so far no plant-derived albumin is available for industrial application.

Rapeseed proteins are a so far rarely exploited reservoir of renewable resources. They are produced as by-products in large quantities e.g. during oil production from rapeseed but also during other agricultural processes. Mostly they are waste products used as animal feed as no pure and thereby technically usable components can be obtained therefrom with economically and technically applicable methods. The two predominant storage proteins in rapeseed, napin and cruciferin, which so far could be obtained only as crude fractions, qualify e.g. based on their physicochemical properties for isolated components for foams or glues (napin) or for production of foils (cruciferin). Furthermore, they are also suitable for application in the food industry, e.g. as foaming agents or stabilizers.

So far mainly precipitation and extraction methods have been employed for obtaining crude protein fractions or enriched compounds at technical scale. In this context it is refered to U.S. Pat. Nos. 4,370,267 and 4,368,151 wherein enrichment of a plant-derived storage component after iso-electric precipitation by extraction under suitable conditions are described. Another method for protein extraction from rapeseed plants is described in WO 2008/14439 A1. All these methods in the state-of-the-art are characterized by a low efficiency. Furthermore, in this way no pure components are obtainable, but only fractions, and mostly such methods have been optimized only for obtaining a single component from a protein mixture. More pure substances have been obtained so far only by complicated lab scale processes which comprise a combination of different purification steps, e.g. 12S globulins from rapesess by a combination of precipitation, dialysis, gel chromatography, and ion exchange chromatography. Furthermore, methods are known which result in protein isolates the composition of which varies as the process conditions do not allow to obtain defined products (WO 2002/089597 A1, WO 2003/043438, WO 2013/000066 A1). Herein neither pure components (napin/cruciferin) nor pure protein mixtures are obtained, but isolates which still contain a high level of other compounds.

Furthermore, in WO 2002/05922 extraction of napin and cruciferin from rapeseed proteins is described, wherein napin is obtained from an acqueous extract by "expanded bed" cation exchange chromatography, and cruciferin from the obtained run through by "expanded bed" anion exchange chromatography. Yet, by this described method proteins cannot be obtained in sufficiently satisfying purity from an industrially available starting material. A similar method has been described in WO 2009/018660 A1. Therein a method is presented by which essentially a pure 2S rapeseed protein shall be obtained from rapeseed meal. Solubilization of the rapeseed proteins from the oily salt solution is carried out at a salt concentration of about 0.25 to 0.35 M at a pH of about 5 to 6. Purification of the 2S rapeseed protein is carried out on a cation exchange column and detachment of the protein from the column by using a salt solution with a salt concentration of 0.55 to 0.7 M. This is a very high salt concentration and it has to be expected that the product must be desalted prior to use.

Another chromatographic purification method for a rapeseed protein mixture has been presented by Hansen et al. on a poster during the "Plant Protein" Meeting on Apr. 15 to 16, 2013 in Nuthetal (Germany). The reaction conditions are described in the publication by Kristjansson et al. (Annual Transactions of the Nordic Rheology Society, Vol. 21, p. 317-320, 2013). After application to two columns two fractions are obtained, wherein one containes a protein with a lower molecular weight (napin) and the other a mixture of different soluble rapeseed proteins.

Therefore, the technical problem underlying the present invention mainly is to provide a purification method for the rapeseed proteins napin and cruciferin or a mixture thereof, resp., from rapeseed plants which avoids the disadvantages of the methods described in the state-of-the-art, i.e. which is industrially scalable, which provides napin or cruciferin, resp., at a degree of purity of at least 95%, or at least 50% for the mixture, resp., and which is compatible with commercially/industrially available rapeseed products such as e.g. rapeseed meal as starting material for purification.

The solution for this technical problem has been achieved by providing the embodiments as disclosed in the patent claims.

Surprisingly, it was found that by the method according to the invention, primarily by maintaining certain ranges of pH values and salt concentrations during the individual purification steps, the desired rapeseed proteins could be separated with high efficiency into pure compounds or be isolated at high purity, resp. In the methods according to the invention in the first step highly pure cruciferin can be obtained simply by precipitation (purity higher than 95%) and from the supernatant highly pure can be obtained by cation exchange chromatography (purity higher than 95%, too). The method according to the invention also delivers a pure rapeseed protein mixture with ca. 55-60%, preferably ca. 57% napin, and with ca. 40-45%, preferably ca. 43% cruciferin.

Therefore, the present invention relates to a method for obtaining a mixture of the rapeseed proteins napin and/or cruciferin from a plant, whereas the method comprises the following steps:

(a) decomposition of the plant for obtaining a raw extract by aqueous extraction;

(b) obtaining the desired proteins from the supernatant of step (a) and adjustment of the supernatant to a pH value in the range of 5.0 to 6.0;

(c) separation of the mixture from step (b) via a cation exchanger with a high salt elution buffer, whereas the pH value of the buffer is in the range of 5.0 to 6.0; and (d) obtaining the eluate.

The present invention also relates to a method for obtaining the rapeseed proteins napin and/or cruciferin from a plant in pure form, whereas the method comprises the following steps:

(a) decomposition of the plant for obtaining a raw extract by acqueous extraction, preferably a pH 5.0-6.0;

(b) obtaining the desired proteins from the supernatant of step (a) and adjustment of the supernatant to a pH value in the range of 3.5 to 4.5;

(c) centrifugation and obtaining the pellet containing the cruciferin;

(d) adjustment of the supernatant from step (c) to a pH value in the range of 7.0 to 8.0;

(e) separation of the mixture from step (d) via a cation exchanger with a high salt elution buffer with a pH value in the range of 7.0 to 8.0; and (d) obtaining the eluate containing the napin.

Preferably the method according to the invention does not comprise further steps, i.e. no pre-treatment steps and/or further purification steps, especially those which are based on the specific physicochemical characteristics of the desired protein, e.g. molecular weight, sedimentation coefficient, pI value, are necessary. Yet, pre-treatment and/or purification steps may be added as the case may be.

By precipitation of the cruciferin from the extraction supernatant of step (a) efficiency if the cation exchange chromatography is strictly increased compared to methods where the protein mixture is applied to the cation exchange chromatography material.

The term "in pure form" as used here means that the protein is essentially free from impurities, preferably has a purity of at least 95%, more preferably of at least 98%, and even more preferably of at least 99%.

For obtaining the proteins any part or tissue of the plant can be used, whereas selection is made according to the varying concentration of the desired protein in the individual parts or tissues of the plant. Preferably the desired protein is obtained from seeds.

Appropriate methods for decomposition of the rapeseed plant are known to the skilled person and he can select suitable decomposition methods for the respectively used plant material. This can e.g. comprise a homogenization such as in a grinder or mixer for obtaining a plant meal and/or lysis with suitable lysis agents.

The skilled person also knows appopriate extraction media and selects these amongst others according to the respective properties of the desired proteins. Preferably the extraction medium is an acqueous solution, especially phosphate buffer, TRIS buffer, MOPS buffer, HEPPS buffer, barbital-acetate buffer, acetic acid-acetate buffer, PBS buffer, MES buffer, or an ethanolic extraction medium.

Preferably the rapeseed proteins are obtained from gently pressed rapeseed meal and for obtaining the raw extract the rapeseed meal is chopped to a smallest possible particle size, preferably in the range of 0.2 to 0.5 mm.

Acqueous extraction preferably is carried out at a temperature in the range of 40 to 60° C., preferably ca. 50° C. Duration of the extraction should be selected such that the desired proteins are as completely extracted as possible. Duration of extraction e.g. can be one hour. Preferably after extraction separation of potentially still present solid components is carried out by centrifugation or by a decanter.

In the method for obtaining the mixture according to the invention the pH value for the steps (b) and (c) is in the range of 6.0 to 5.0, preferably 5.5 to 6.0. Most prefered is a pH value of ca. 5.7 to 5.8. After centrifugation or decanting, resp., the pH value of the supernatant is adjusted to the value desired for the subsequent ion exchange chromatography, preferably with sodium hydroxide solution. After equilibration of the chromatography column with loading buffer to the same pH value the supernatant is loaded onto the column and subsequently the column is washed with loading buffer. In case of carrying out the chromatography by the EBA method the column preferably is washed in expanded state with 15-18 column volumes of loading buffer. For other types of chromatography washing is carried out with a respectively adapted number of column volumes. After elution of the rapeseed protein mixture with elution buffer the eluate is desalted and preferably lyophilized.

In the method for obtaining the individual proteins according to the present invention the pH value in step (b) is in the range of 3.5 to 4.5, preferably 3.8 to 4.2, whereas a pH value of ca. 3.9 to 4.1 is most prefered, and in steps (d) and (e) in the range of 7.0 to 8.0, preferably 7.2 to 7.8. Most prefered is a pH value of ca. 7.4 to 7.6.

Adjustment of the pH value preferably is carried out with sodium hydroxide solution. In the method for obtaining the individual proteins in pure form according to the present invention after centrifugation or decanting, resp., the supernatant of the extraction solution preferably is cooled down to 6 to 10° C. Then the cooled solution is adjusted to the desired pH value, whereas preferably citric acid or 1 M HCl solution is used for that. After that preferably over a longer period of time, e.g. ca. 1 h at 6-10° C., the solution is stirred and then the precipitated cruciferin is centrifuged at >4,000 g. The pellet contains pure cruciferin and a further purification can, if desired, be achieved by e.g. several times washing with deionized water. Finally, lyophilization can be carried out. The further purification steps for the napin via ion exchange chromatography by their meaning correspond to those for obtaining the mixtures as above (with modified pH values).

In a preferred embodiment of the method according to the invention the loading and/or elution buffer used for chromatography is a phosphate buffer. Its molarity preferably is in the range of 5 mM to 80 mM, whereas a range of 10 mM to 40 mM is more preferred. Most preferred is a value of ca. 20 mM.

The term "high salt elution buffer" as used here correlates to an elution buffer (e.g. a phosphate buffer) with a salt content which is such high that binding of the proteins to be eluted to the bead material used for chromatography is unset. Preferably the elution buffer for this purpose contains NaCl in the range of 0.2 to 0.6 M. More preferred is a range of 0.3 to 0.5 M. Most preferred is a value of ca. 0.4 M According to the invention a cation exchange chromatography is executed in order to purify the desired proteins. One applicable chromatography method amongst various others is the "Expanded Bed Adsorption Chromatography" (EBA). The EBA technology is scalable to the large technical scale and does not require complex apparatus technology. The adsorbents show little signs of "fouling" so that long life time of the chromatography columns is ensured.

A preferred matrix material for the cation exchange chromatography in the method according to the invention is Streamline SP XL™ (GE Healthcare). Other matrix materials are Amberlite adsorber (Dow Chemical), Antibodix adsorber (Sepax Technologies), Proteomix adsorber (Sepax Technologies), DEAE Sepharose (e.g. Sigma Aldrich), SP Sepharose (e.g. GE Healthcare), Whatman cation adsorber (GE Healthcare), ZirChrom-PEZ adsorber (ZirChrom Separations).

Examples for application markets for the proteins according to the invention are. bakery, sweeties, dairy products, delicacies, oily emulsions, emulgators, paints, dispersions, glues, papers, functional foamers, animal feed (e.g. acquaculture), cosmetics, polymers, pharmaceuticals, nutraceuticals, and functional food.

Due to the achieved high purity of the products these are neutral in taste and, therefore, are very well suited food additives which do not alter or negatively affect the original taste of the food.

Napin produced according to the invention is suitable—as being a basic protein—especially for stabilization of foams in the presence of oil and sugar if it is employed in combination with an acidic protein (oil tolerant foaming system). An acidic protein (e.g. whey protein) in combination with napin thus could replace the expensive hen egg white lysozyme.

Furthermore, especially for napin use as a vegan delicary, a functional foamer in dairy products, as imitation cheese, or as plant-derived cream can be considered.

Cruciferin can especially be used for applications where a strong foam stabilization in the presence of oil is required, among others also in technical applications. Additionally to be underlined are its good film forming, gel forming, and gelating properties.

For the rapeseed protein mixture applications amongst others in the food, cosmetics and technical industries, where a high to very high foam capacity and stability, also in presence of oils, combined with high solubility is required, are of great interest.

BRIEF DESCRIPTION OF DRAWINGS

Lane 4: residue after dissolving of the protein mixture at pH 10.0
Lane 5: dissolved protein mixture at pH 4.0
Lane 6: dissolved protein mixture at pH 7.0
Lane 7: dissolved protein mixture at pH 10.0
L: lysozyme

EXAMPLE 1

Figure 1:
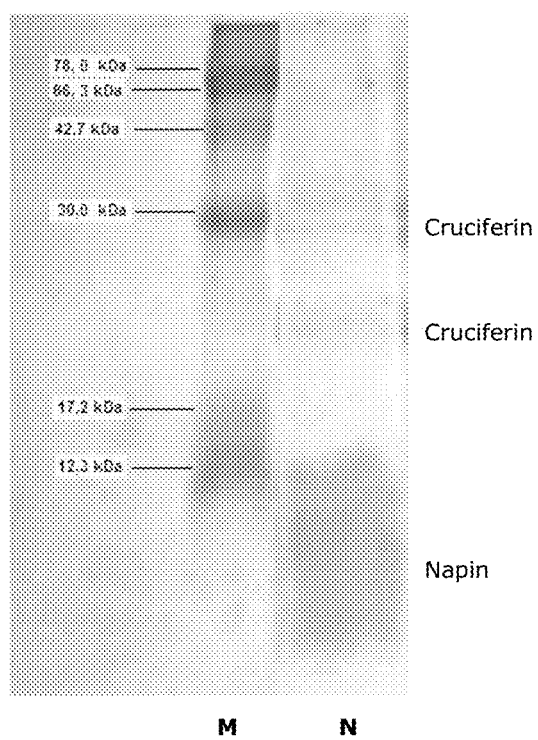
FIG. 1: Results from SDS-PAGE of the napin purified according to QO 2002/05922
M: marker; N: napin; C: cruciferin
Typical result from quantification:
napin: 82%; cruciferin: ca. 9%; other proteins: ca. 9%

Purification of Napin and Cruciferin from Non-Deoiled Rapeseed Seeds

Processing of Rapeseed Seeds
Rapesed seeds for inactivation of myosin by heat conditioning is treated in a paddle dryer type D 600 (DVA Deutsche Vakuumapparate Holland Merten GmbH). By the shovel mechanism the seeds are mixed with a speed of 10 min$^{-1}$. Heat influx occurs through a double mantle of the paddle dryer, heated by steam. Heat treatment is performed for 15 min and the temperature of the seed at the end of the process is 75 to 80° C. The rapeseed subsequently are processed in a screw compactor (IBG Monforts Oekotec GmbH & Co. KG, Monchengladbach) for oil production. The pressing temperature is between 50 and 60° C. The rapeseed meal subsequently is subjected to h-hexane extraction. This is carried out in a pilot facility of the company Bio-Ingenieurtechnik GmbH (Leipzig) by solid-fluid-extraction with a miscella distillation. Extraction is performed or 2 hours at a temperature of 58 to 60° C. in two steps. After n-hexane extraction the residual oil content is 1 to 2% (w/w). The subsequent desolventization of the rapeseed meal is carried out in a fluidized bed dryer. Hexane is eliminated from the rapeseed meal by a desolventization period of 15 min with an operating temperature of the fluidized bed of ca. 80° C. After desolventization the rapeseed meal is chopped in several steps to a range of 0.2 to 0.5 mm with a corrugated roll type Haferboy (Egon Simmer Maschinenbau GmbH & Co. KG).

Protein Extraction

The rapeseed meal is stirred for one hour at 50° C. in a ratio of 1:10 in aqueous solution. The pH value of the solution is in the range of 5.4 to 5.8. Subsequently the solution is centrifuged at >4,000 g.

Production of Cruciferin

The supernatant from protein extraction is cooled to 6 to 10° C. After adjustment to pH 4 with citric acid the solution is stirred for 30 min and subsequently centrifuged >4,000 g. This step can be repeated several times. The obtained residue is lyophilized.

Production of Napin

The supernatant from cruciferin production with a dry matter content of 3.3% is adjusted to pH 7.5 with sodium hydroxide solution. For expanded bed adsorption chromatography (EBA) a Streamline 25 column (GE Healthcare), filled with 160.5 ml tcation adsorber Streamline SP XL (GE Healthcare), is used. With 15 ml/min the binding buffer (20 mM phosphate buffer, ph 7.5) flows towards the adsorber and the adsorber is expanded with 6 column volumes of buffer. Subsequently the solution supernatant, e.g. 2,000 ml) is pumped through the column with 15ml/min, too. In the following step the residual supernatant present in the column is removed by flowing with binding buffer at a 15 ml/min flow rate, too, until a final UV of <180 mAU is reached. The required volume of binding buffer is about 15 to 18 column volumes. After that the adsorbed proteins are eluted. The elution buffer used is a 20 mM phosphate buffer solution with pH 7.5 and 0.4 M NaCl. The eluate is subsequently desalted by membrane filtration with a coiled PES-based membrane with a cut-off of 10 kDa (Millipore GmbH) until a conductivity of <500 µS/cm is reached and then lyophilized. Regeneration of the binding capacity of the adsorber is achieved in four steps with a 0.5 M NaOH+1 M NaCl solution, with DI water, 25% acetic acid, and finally with binding buffer.

EXAMPLE 2

Purification of a Mixture of Napin and Cruciferin from Non-Deoiled Rapeseed Seeds The extraction solution from protein extraction according to example 1 is adjusted to pH 5.5 after separation without precipitation. Equilibration of the adsorber is done with binding buffer at pH 6.6. The extraction solution subsequently is pumped through the EBA column with a flow rate of 15 ml/min. The following steps are the same as for the production of napin. For elution of the proteins the elution buffer (0.4 M NaCl) is adjusted to pH 5.5. The obtained elution solution is filtrated to a conductivity of <600 µS/cm and lyophilized.

EXAMPLE 3

Product Characterization of the Individual Proteins Napin and Cruciferin

Napin
Albumin ("2S protein")
20% of seed proteins
14.5 kDa
2 chains: 10 and 4.5 kDa
strongly basic protein
many isoforms
Cruciferin
Globulin ("12S protein")
ca. 60% of seed proteins
300 kDa
composed of 6 subunits, 3 to 4 are stainable with Coomassie in the range of 20-30 kDa
neutral
many isoforms
Isoelectric Points:
Lysozyme: 11.0
BSA: 4.6
Napin: >10
Cruciferin: ca. 7.25
Ovalbumin: 4.5

(A) Pure Napin Produced by the Method According to the Invention

Protein content 98%; purity (=Napin content) >98% (residual <2% cruciferin); high denaturation stability (much higher than for ovalbumin); solubility at pH 7.0 (after Morr, 1985): very good (ca. 100%, comparable to ovalbumin); foaming capacity (after Kroll, 1984): 250% (ovalbumin 170%), i.e. higher than for ovalbumin; foam stability after 30 min (after Kroll, 1984): 35% (ovalbumin 39%), i.e. comparable to ovalbumin.

Tests after Poole (1984) for foam stabilization (in presence of 1% BSA (i.e. an acidic protein, oil and sugar):
Foam Stability: 0.3% napin: 18% 0.3% napin + 1% BSA + 5% oil + 10% sucrose: 74% for comparison:
0.3% lysozyme + 1% BSA + 5% oil + 10% sucrose: 91%
Drainage:
0.3% napin: 98%
0.3% napin + 1% BSA + 5% oil + 10% sucrose: 65% for comparison:
0.3% lysozyme + 1% BSA + 5% oil + 10% sucrose: 55%
Napin (a basic protein) can stabilize foams in the presence of oil and sugar if applied in combination with an acidic protein (oil tolerant foaming system). An acidic protein (e.g. whey protein) in combination with napin therefore could replace the expensive hen egg white lysozyme.
Emulsification Properties:
Phase stability good, heat stability very good.

(B) Pure Cruciferin Produced by the Method According to the Invention

Protein content >95%; purity (=protein content) >95% (residual <3% napin and <2% other proteins); moderate denaturation stability, is lower than for ovalbumin; solubility at pH 7.0 (after Morr, 1985): bad (ca. 10%); foaming capacity (after Kroll, 1984): 100% (ovalbumin 170%), i.e. moderate; foam stability after 30 min (after Kroll, 1984): 38% (ovalbumin 39%), i.e. comparable to ovalbumin.

Emulsification Properties:

Phase stability bad, heat stability good.

(C) Protein Mixture Produced by the Method According to the Invention

Protein content >99.5%, typically contains ca. 56-57% napin and ca. 41-43% cruciferin; low denaturation stability, much lower as for ovalbumin and also as for cruciferin; solubility at pH 7.0 (after Morr, 1985): good (ca. 75%); foam capacity (after Kroll, 1984): 300% (ovalbumin 170%), i.e. very high; foam stability after 30 min (after Kroll, 1984): 82% (ovalbumin 39%), i.e. very high, too.

Emulsification Properties:

Phase stability bad, heat stability bad.

Behavior at Different pH Values:

The obtained protein mixture has been eluted at pH 5.5 and at the end of the purification process lyophilized, then redissolved at pH values 4.0, 7.0 und 10.0; the protein solution and the undissolved residue have been tested by SDS gel chromatography

TABLE 1

|  | napin content | cruciferin content | other proteins |
| --- | --- | --- | --- |
| Pure protein mixture | 56% | 41% | 3% |
| solution at pH 4.0 | 49% | 46% | 5% |
| solution at pH 7.0 | 53% | 43% | 4% |
| solution at pH 10.0 | 50% | 47% | 3% |
| residue at pH 4.0 | 20% | 73% | 7% |
| residue at pH 7.0 | 16% | 76% | 8% |
| residue at pH 10.0 | 49% | 46% | 5% |

Napin as a basic protein as expected easily dissolves at pH 4.0 and 7.0 (almost nothing in residue) but at pH 10.0 it is much less dissolvable. Whereas cruciferin obviously and as expected is much less dissolvable from the lyophylisate. At pH 4.0 and 7.0 it represents the major part of the residue. The protein mixture surprisingly is well dissolvable over a broad range of pH and not only redissolvable at pH 5.5. Essentially it has the same composition as before lyophilization. The lower denaturation stability as outlined above indicates an interaction/association of napin and cruciferin in the protein mixture so that a property profile differing from that of the individual components results.

SUMMARY OF THE PROPERTIES OF THE PROTEINS PRODUCED ACCORDING TO THE INVENTION

TABLE 2

|  | napin | cruciferin | protein mixture |
| --- | --- | --- | --- |
| solubility | +++ | --- | + |
| foam capacity | ++ | + | +++ |
| foam capacity with sunflower oil | -- | + | ++ |
| foam stability | - | - | ++ |
| foam stability with sunflower oil | - | +++ | ++ |

TABLE 2-continued

|  | napin | cruciferin | protein mixture |
| --- | --- | --- | --- |
| emulsifying properties | +++ | --- | --- |
| foam capacity after Poole | +++ | | |
| foam stability after Poole | +++ | | |

Figure 5:
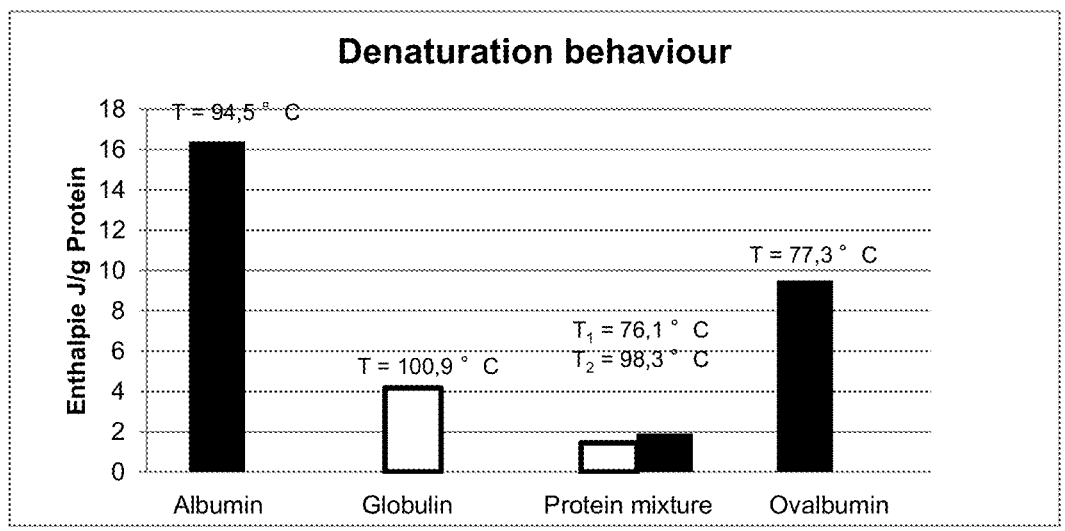
FIG. 5: Investigation of the denaturation behavior (Heat enthalpy/method DSC, modified according to Sousa (SOUSA, I. eta.; Differential scanning calorimetry of lupin and soy protein;
Zeitschrift für Lebensmittel-Untersuchung und Forschung; 201:566-589 (1995))
Albumin: chromatographically purified napin
Globulin: precipitated cruciferin
Protein mixture: chromatographically purified rapeseed protein mixture (the two components napin and cruciferin show a differing denaturation behavior; therefore to data are indicated).
Ov-Albumin: hen egg ovalbumin
FIG. 6: Investigation of protein solubility after Morr (1985) (MORR, C. V.; Collaborative study to develop a standardized food protein solubility procedure; Journal of Food Science; 50:1715-1718 (1985))
FIG. 7: Investigation of foaming capacity after Kroll (1984) (KROLL; J. et al.; Beeinflussung funktioneller Eigenschaften von Proteinen durch gekoppelte mechanolytische und chemische Modifizierung; Die Nahrung 28, No. 4, 389-396 (1084))
FIG. 8: Investigation of foam stability after Kroll (1984) (KROLL; J. et al.; Beeinflussung funktioneller Eigenschaften von Proteinen durch gekoppelte mechanolytische und chemische Modifizierung; Die Nahrung 28, No. 4, 389-396 (1084))
FIG. 9: Investigation of foam stability after Poole in the presence of acidic proteins and sugar (POOLE, S., WEST, S. I. and WALTERS, C. L. M.; Protein-protein interactins: Their importance in the foaming of hertgoeneous protein systems; J. Sci. Food Agrlc., 35:701-711 (1984))
A: 0.3% napin
B: 0.3% napin + 1% BSA
C: 0.3% napin + 1% BSA + 5% oil
D: 0.3% napin + 1% BSA + 5% oil + 10% sucrose
E: 0.3% hen egg lysozyem + 1% BSA + 5% oil + 10% sucrose
FIG. 10: Investigation of emulsifying properties after Muschiolik (2013) (MUSCHIOLIK, Gerald; Untersuchungen zur Technofunktionalität von Proteinproben; Prufbericht, 2013)
Phase stability:
+++ completely stable
++ bottom little water
- little deposition of water
--- strong deposition of water
Heat stability:
+++ stable, no phase separation, no high content of air, no deposition of oil
[1]) Emulsion particles adsorb to air bubbles
The following examples demonstrate the invention.
Figure 6:
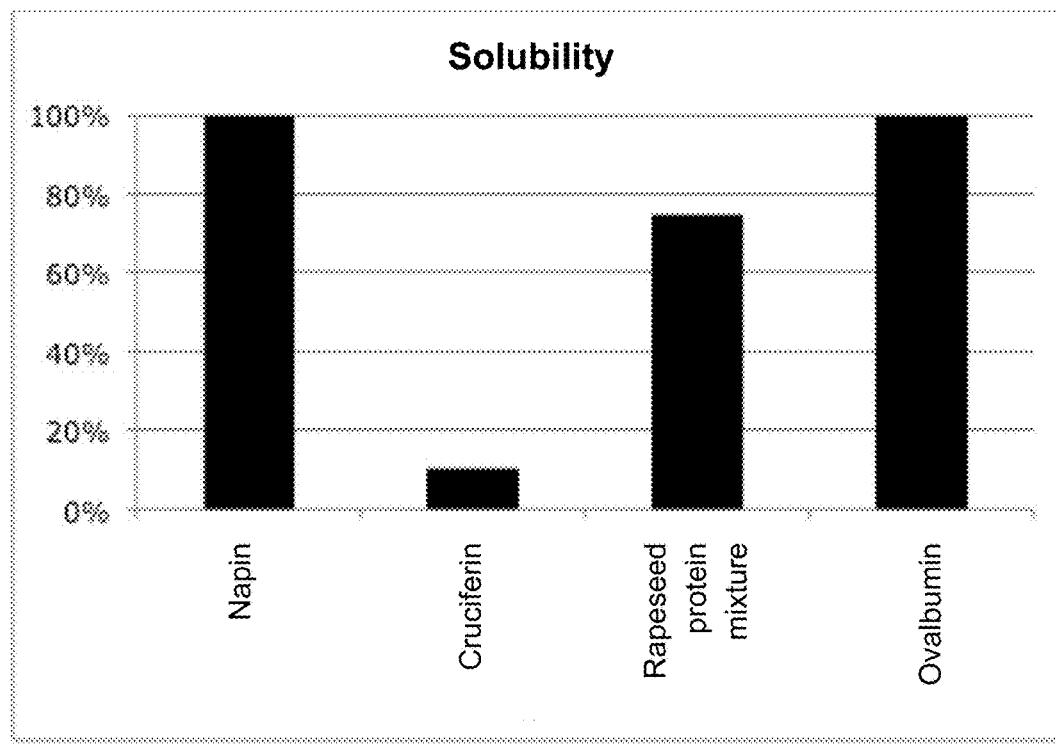
Figure 7:
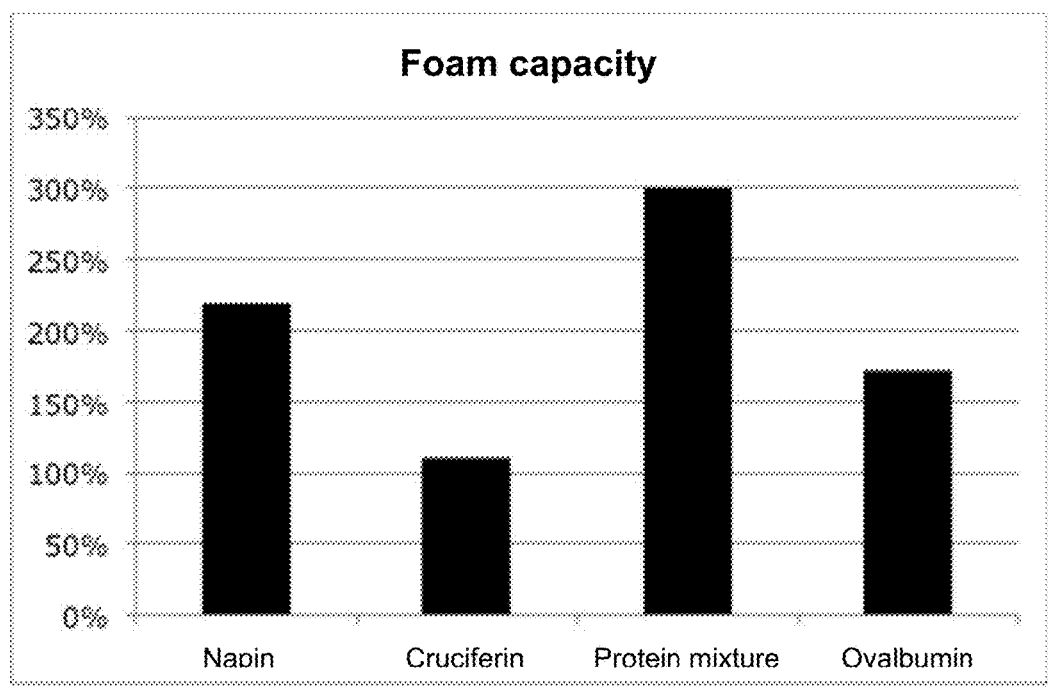
Figure 8:
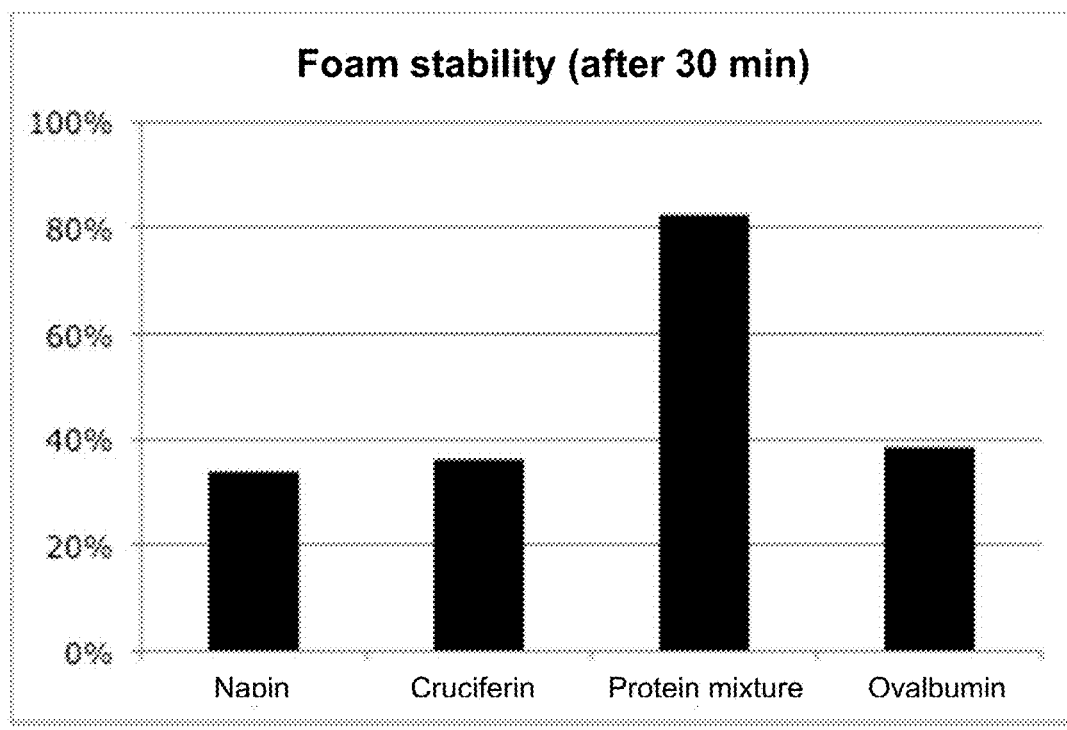
Figure 9:
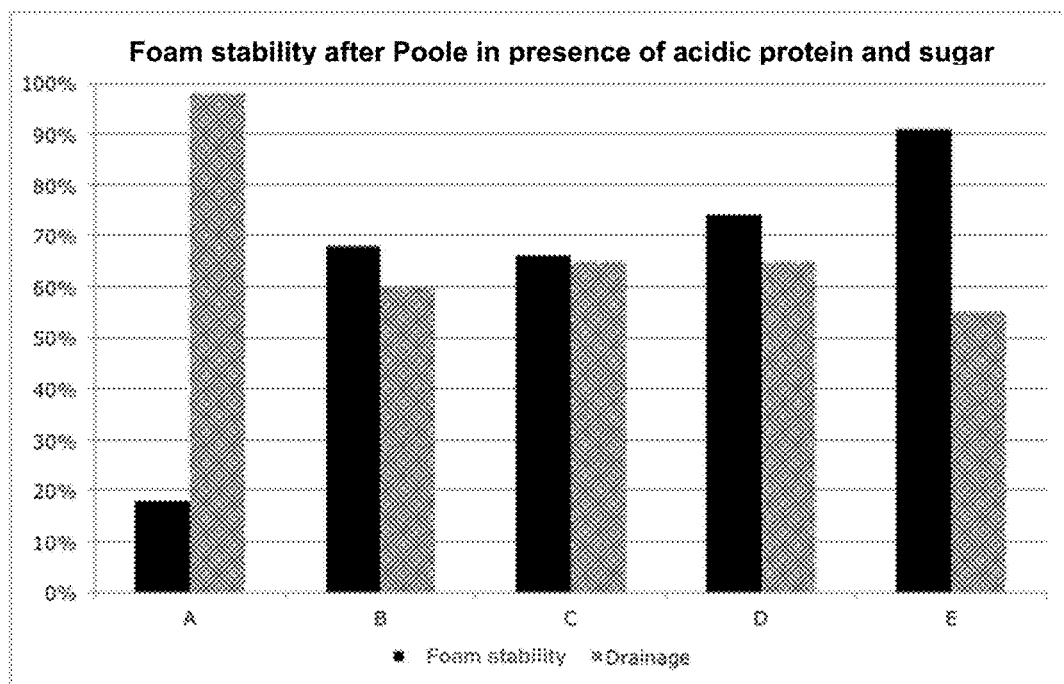

These product characteristics are graphically displayed in FIGS. 5 to 10.

Figure 2:
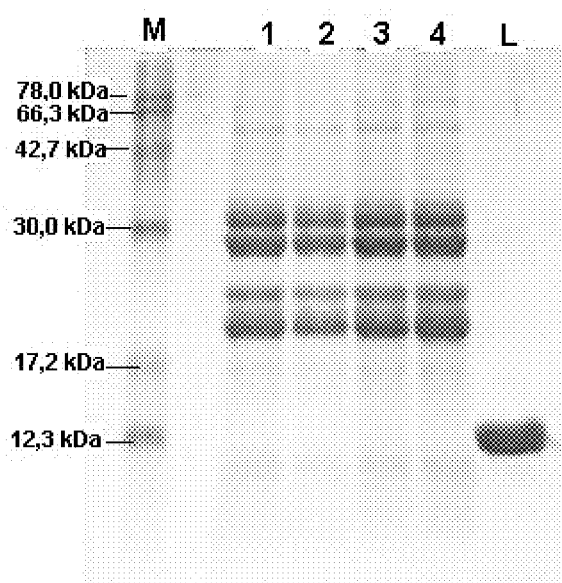
FIG. 2: Results from SDS-PAGE of the cruciferin precipitated according to Example 1
M: marker; Lanes 1-4: precipitated cruciferin; N: hen egg white lysozyme
Typical result from quantification:
napin: <3%%; cruciferin: >95%; other proteins: <2%
Figure 3:
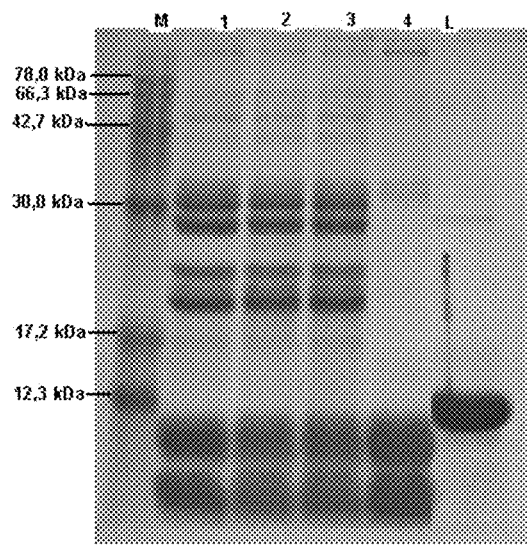
FIG. 3: Results from SDS-PAGE of the rapeseed protein mixture purified according to Example 2
M: marker; Lanes 1-3: chromatographically purified rapeseed protein mixture; Lane 4: chromatopgraphically purified napin; L: lysozyme
Typical result from quantification for the rapeseed protein mixture:
napin: ca. 57%%; cruciferin: ca. 43%
Typical result from quantification for napin:
napin: <98%%; cruciferin: <2%
Figure 4:
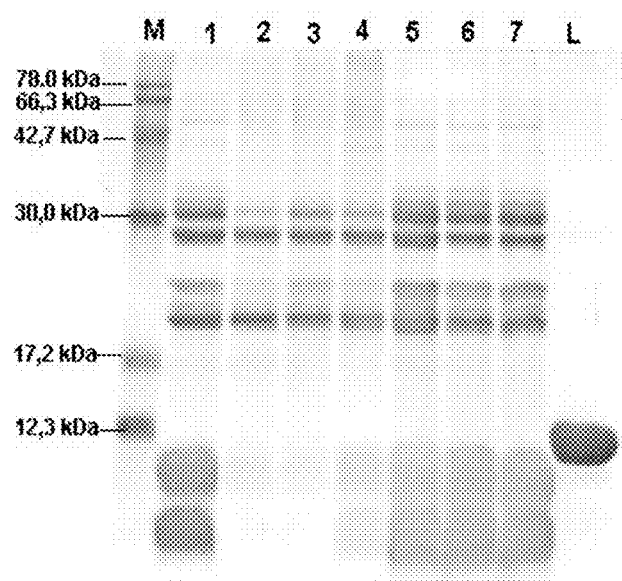
FIG. 4: Results from SDS-PAGE of the rapeseed protein mixture purified according to Example 2 when applying varying pH values for dissolving the residue
M: marker
Lane 1: protein mixture at pH 5.5
Lane 2: residue after dissolving of the protein mixture at pH 4.0
Lane 3: residue after dissolving of the protein mixture at pH 7.0

For the SDS-PAGE analyses which are shown in FIGS. 1-4 standard methods known to the skilled person have been used.

The invention claimed is:

1. A method for obtaining the rapeseed proteins napin and cruciferin in a pure form from a plant, wherein the method comprises the following steps:
    (a) processing of the plant for obtaining a raw extract by aqueous extraction at pH 5.0-6.0 and subjecting the raw extract to steps comprising centrifugation or decanting to obtain a supernatant containing napin and cruciferin;
    (b) adjusting the supernatant of step (a) to a pH value in the range of 3.5 to 4.5;
    (c) centrifuging the supernatant of step (b) and obtaining a pellet containing cruciferin in pure form;
    (d) adjusting the supernatant from step (c) with a binding buffer to a pH value in the range of 7.0 to 8.0 to form a mixture;
    (e) separating the mixture from step (d) on a cation-exchange medium with a high salt elution buffer with a pH value in the range of 7.0 to 8.0; and
    (f) obtaining an eluate containing napin in pure form from the separation of step (e).

2. The method according to claim 1, whereas the pH value in step (b) is in the range of 3.8 to 4.2 and in steps (d) and (e) in the range of 7.2 to 7.8.

3. The method according to claim 1, wherein the binding buffer in step (d) contains 10-40 mM phosphate ions.

4. The method according to claim 3, wherein the binding buffer contains about 20 mM phosphate ions.

5. The method according to claim 1, wherein the high salt elution buffer in step (e) contains 10-40 mM phosphate ions and 0.3-0.5 M NaCl.

6. The method according to claim 5, wherein the high salt elution buffer contains about 20 mM phosphate ions and about 0.4 M NaCl.

7. The method according to claim 1, wherein the pH in step (a) is 5.4 to 6.0.

8. The method according to claim 1, wherein the pH in step (a) is 5.4 to 5.8.

9. A method for obtaining the rapeseed protein cruciferin in a pure form from a plant, wherein the method comprises the following steps:
    (a) processing of the plant for obtaining a raw extract by aqueous extraction at pH 5.0-6.0 and subjecting the raw extract to steps comprising centrifugation or decanting to obtain a supernatant containing cruciferin;
    (b) adjusting the supernatant of step (a) to a pH value in the range of 3.5 to 4.5; and
    (c) centrifuging the supernatant of step (b) and obtaining a pellet containing cruciferin in pure form.

10. The method according to claim 9, wherein the pH in step (a) is 5.4 to 6.0.

11. The method according to claim 9, wherein the pH in step (a) is 5.4 to 5.8.

12. The method according to claim 9, whereas the pH value in step (b) is in the range of 3.8 to 4.2.

* * * * *